US008743785B2

(12) United States Patent
Qu et al.

(10) Patent No.: US 8,743,785 B2
(45) Date of Patent: Jun. 3, 2014

(54) SYSTEM AND METHOD FOR REDUCING INTERFERENCE

(75) Inventors: Bingyu Qu, Schaumburg, IL (US); Philippe Sartori, Algonquin, IL (US); Weimin Xiao, Hoffman Estates, IL (US); Brian Classon, Palatine, IL (US); Vipul Desai, Palatine, IL (US); Anthony C. K. Soong, Plano, TX (US); Zhongfeng Li, Shanghai (CN)

(73) Assignee: Futurewei Technologies, Inc., Plano, TX (US)

( * ) Notice: Subject to any disclaimer, the term of this patent is extended or adjusted under 35 U.S.C. 154(b) by 219 days.

(21) Appl. No.: 13/210,119

(22) Filed: Aug. 15, 2011

(65) Prior Publication Data

US 2013/0044678 A1    Feb. 21, 2013

(51) Int. Cl.
*H04W 52/04* (2009.01)
*H04W 92/00* (2009.01)
*H04W 52/24* (2009.01)

(52) U.S. Cl.
CPC .................................. *H04W 52/244* (2013.01)
USPC ......................................................... 370/328

(58) Field of Classification Search
CPC . H04W 52/22; H04W 52/241; H04W 52/244; H04W 52/343; H04W 56/0015; H04W 72/082; H04L 5/0007
USPC .......... 370/310, 328–330; 455/73, 550.1, 561
See application file for complete search history.

(56) References Cited

U.S. PATENT DOCUMENTS

| 6,567,383 | B1 * | 5/2003 | Bohnke | 370/280 |
|---|---|---|---|---|
| 8,072,931 | B2 * | 12/2011 | Higuchi et al. | 370/329 |
| 8,155,681 | B2 * | 4/2012 | Iwamura et al. | 455/509 |
| 8,265,031 | B2 * | 9/2012 | Tanno et al. | 370/330 |
| 8,320,922 | B2 * | 11/2012 | Achour et al. | 455/450 |
| 8,428,016 | B2 * | 4/2013 | Bhattad et al. | 370/329 |
| 2007/0211661 | A1 * | 9/2007 | Tee et al. | 370/329 |
| 2011/0274076 | A1 | 11/2011 | Classon et al. | |
| 2012/0113939 | A1 * | 5/2012 | Kim et al. | 370/329 |

(Continued)

FOREIGN PATENT DOCUMENTS

| WO | WO 2010/078843 A1 | 7/2010 |
|---|---|---|
| WO | WO 2011/140983 A1 | 11/2011 |
| WO | WO 2011/147340 A1 | 12/2011 |

OTHER PUBLICATIONS

"3GPP TS 36.211 V10.2.0, $3^{rd}$ Generation Partnership Project; Technical Specification Group Radio Access Network; Evolved Universal Terrestrial Radio Access (E-UTRA); Physical Channels and Modulation (Release 10)," $3^{rd}$ Generation Partnership Project, Jun. 2011, 23 pages.

(Continued)

*Primary Examiner* — Chi Pham
*Assistant Examiner* — Robert Lopata
(74) *Attorney, Agent, or Firm* — Slater & Matsil, L.L.P.

(57) ABSTRACT

A system and method for reducing interference are provided. A method for communications controller operations in a multi-carrier system includes generating information for a broadcast channel, preparing the information for transmission, selecting a location for an unoccupied subcarrier from a plurality of available locations, and placing the prepared information into a plurality of contiguous subcarriers, where the plurality of contiguous subcarriers includes the unoccupied subcarrier and a plurality of other subcarriers. The method also includes transmitting the plurality of contiguous subcarriers.

39 Claims, 10 Drawing Sheets

(56) References Cited

U.S. PATENT DOCUMENTS

2012/0289289 A1* 11/2012 Tanno et al. .................. 455/561
2013/0003668 A1* 1/2013 Xiao et al. .................... 370/329
2013/0208686 A1* 8/2013 Zhang et al. .................. 370/329

OTHER PUBLICATIONS

"3GPP TSG-WG1 #62, Summary of the Description of Candidate eICIC Solutions," CMCC (Rapporteur), Madrid Spain, Aug. 23-27, 2010, 6 pages.

* cited by examiner

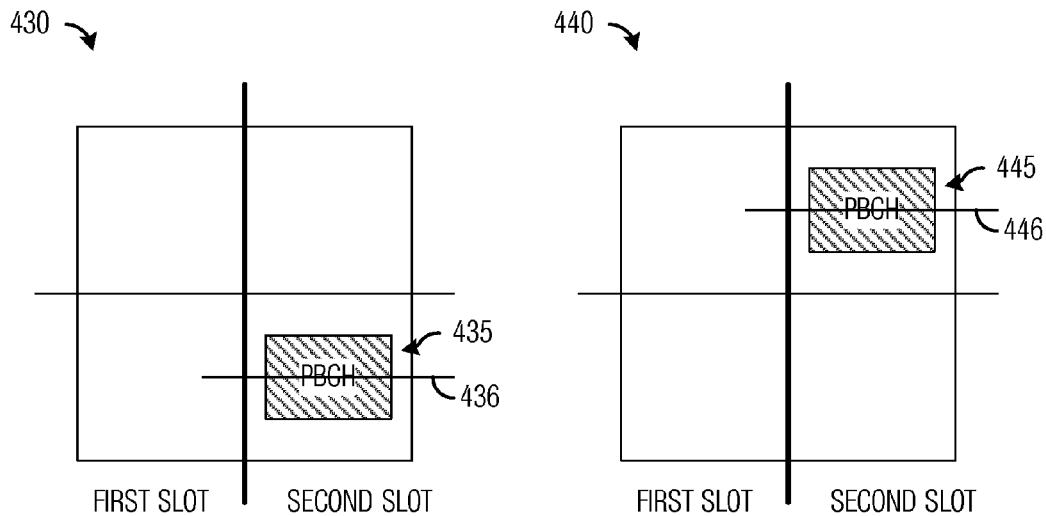
Fig. 4d
Fig. 4e
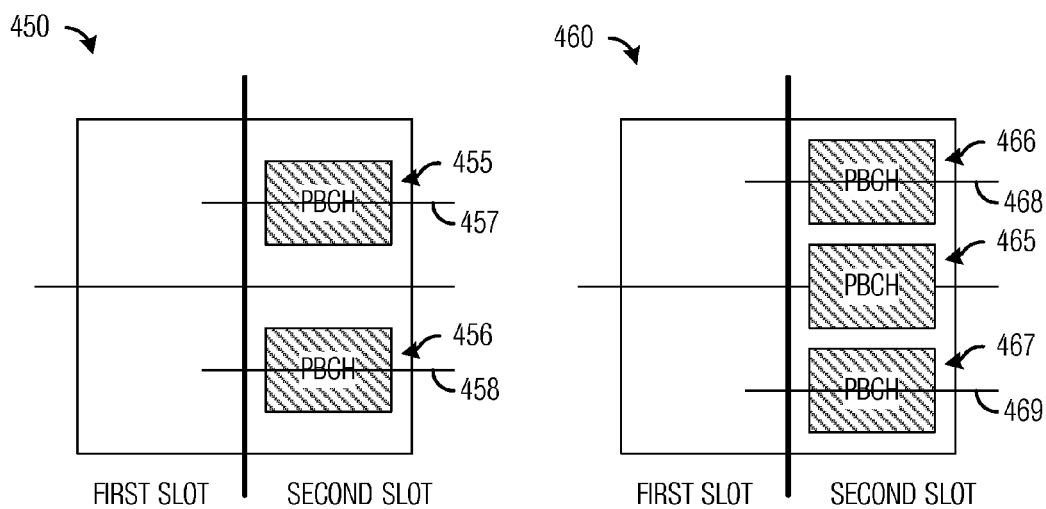
Fig. 4f
Fig. 4g

SYSTEM AND METHOD FOR REDUCING INTERFERENCE

TECHNICAL FIELD

The present invention relates generally to digital communications, and more particularly to a system and method for reducing interference.

BACKGROUND

Heterogeneous networks (HetNets) represent a substantial shift from classical cellular network deployment, as seen in homogeneous networks (HomoNets), towards an anarchic deployment, which may result in a high level of interference usually not experienced in HomoNets.

Generally, a HetNet may include a planned network of high power macro cells (which are typically deployed in a HomoNet) along with an unplanned network of low power cells (LPC), including femto cells, pico cells, relay nodes (RN), and so forth, interspersed within the high power macro cells. The LPCs may be added in or around areas with poor coverage and/or high user concentration to help improve overall communications system performance. In general, high power macro cells and LPCs may be referred to as communications controllers.

FIG. 1 illustrates a prior art HetNet 100. HetNet 100 includes a number of enhanced NodeBs (eNB), which are examples of high power macro cells, such as eNB 105, eNB 107, and eNB 109. eNBs may also be commonly referred to as controllers, base stations, NodeBs, and so forth. eNBs may be used to control communications to and from User Equipment (UE), with the eNBs assigning network resources for transmitting to the UEs and for receiving transmissions from the UEs. For example, eNB 105 may control UE 110, eNB 107 may control UE 112, and eNB 109 may control UE 114. UEs may also be commonly referred to as mobiles, terminals, subscribers, users, mobile stations, and so on.

HetNet 100 also includes a number of LPCs, such as LPC 120, LPC 122, and LPC 124. An LPC may control a UE by itself or it may operate in conjunction with other LPCs and/or eNBs to control a UE. As shown in FIG. 1, LPC 120 may control UE 112 in combination with eNB 107. Similarly, LPC 122 and LPC 124 along with eNB 109 control UE 114.

In the Third Generation Partnership Project (3GPP) Long Term Evolution (LTE) Release 10 technical standards, certain channels and signals may be broadcast in predefined subframes by eNBs and/or LPCs (i.e., communications controllers). For example, a physical broadcast channel (PBCH) may be transmitted in subframe zero, a primary synchronization signal (PSS) may be broadcast in subframes zero and five for a frequency division duplexing (FDD) configuration and in subframes one and six for a time division duplexing (TDD) configuration, while a secondary synchronization signal (SSS) may be broadcast in subframes zero and five.

Even with the use of interference mitigation techniques, such as almost blank subframes (ABS), a common reference sequence (CRS) is transmitted on the first symbol of the subframe along with the PBCH, the PSS, and the SSS in appropriate subframes. Therefore, there is a considerable number of channels and signals being transmitted. In a HomoNet with a relatively small number of high power macro cells, e.g., eNBs, interference between the CRS, PBCH, PSS, SSS, and so on, is not a significant problem. However, in a HetNet with a potentially large number of LPCs as well as the high power macro cells, interference between the CRS, PBCH, PSS, SSS, and so on, broadcast by the communications controllers may be a significant problem. This problem is further exacerbated by the unplanned (or less planned) nature of LPC deployments. Since a LPC may be deployed close to an eNB and/or another LPC, a UE may suffer from high interference on the CRS, PBCH, PSS, SSS and so on.

Therefore, there is a need for a system and method for reducing interference.

SUMMARY OF THE INVENTION

These and other problems are generally solved or circumvented, and technical advantages are generally achieved, by example embodiments of the present invention which provide a system and method for reducing interference.

In accordance with an example embodiment of the present invention, a method for communications controller operations in a multi-carrier system is provided. The method includes generating information for a broadcast channel, preparing the information for transmission, selecting a location for an unoccupied subcarrier from a plurality of available locations, and placing the prepared information into a plurality of contiguous subcarriers, where the plurality of contiguous subcarriers includes the unoccupied subcarrier and a plurality of other subcarriers. The method also includes transmitting the plurality of contiguous subcarriers.

In accordance with another example embodiment of the present invention, a communications controller is provided. The communications controller includes an information generation unit, a transmission processing unit, a location unit configured, and a transmitter. The information generation unit generates information for a broadcast channel, the transmission processing unit prepares the information for transmission, and places the prepared information into a plurality of contiguous subcarriers, where the plurality of contiguous subcarriers includes an unoccupied subcarrier and a plurality of other subcarriers. The location unit selects a location for the unoccupied subcarrier from a plurality of available locations, and the transmitter transmits the plurality of contiguous subcarriers.

In accordance with another example embodiment of the present invention, a method for communications device operations is provided. The method includes determining a location of a broadcast channel based on an identifier, decoding the broadcast channel at the location based on the identifier to retrieve information, decoding an indicator from the information, and determining a carrier frequency based on the indicator.

In accordance with another example embodiment of the present invention, a communications device is provided. The communications device includes a search control unit, a decode unit, and a carrier frequency unit. The search control unit determines a location of a broadcast channel based on an identifier, the decode unit decodes the broadcast channel at the location based on the identifier to retrieve information, and decodes an indicator from the information, and the carrier frequency unit determines a carrier frequency based on the indicator.

One advantage disclosed herein is that broadcast channels and/or signals may be moved to different locations to help reduce interference on the channels and/or signals. Certain channels and/or signals may be left in current locations to provide support for legacy devices.

A further advantage of exemplary embodiments is that the transmit power level of channels and/or signals may be adjusted to help reduce interference. The transmit power level may be adjusted based on operating conditions, desired interference levels, and so on.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 3a through 3c illustrate example subframes when the PBCH, SSS, and PSS are present in the subframe, wherein a number of possible locations for the PBCH, SSS, and PSS are highlighted according to example embodiments described herein;

FIGS. 4a through 4g illustrate example subframes when the PBCH is present in the subframe, wherein possible PBCH locations are highlighted according to example embodiments described herein;

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

One example embodiment of the invention relates to reducing interference between transmissions of communications controllers by using different locations for previously fixed location control channels and/or using power control for the transmission of the control channels. For example, after generating information for a control channel and preparing it for transmission, a location is selected for the control channel and the information is placed in the location and then transmitted. The location includes an unoccupied subcarrier that is normally the center frequency of the control channel. At the mobile side, the mobile detects and decodes a broadcast signal to determine an identifier, which it uses to determine a location of the control channel. It then decodes the control channel to obtain an indicator that it uses to determine a carrier frequency.

The present invention will be described with respect to example embodiments in a specific context, namely a 3GPP LTE Release 11 or later compliant communications system that supports a HetNet deployment and utilizes broadcast channels and/or signals. The invention may also be applied, however, to other standards compliant communications systems, such as IEEE 802.16, WiMAX, and so forth, as well as non-standards compliant communications systems that support HetNet deployments and/or other deployment scenarios, including range extension, with broadcast channels and/or signals.

Although the discussion presented below focuses on the PBCH, as well as PSS and SSS, the example embodiments presented herein may be applicable to broadcast channels and/or signals in general. Therefore, the discussion of PBCH, PSS, and SSS should not be construed as being limiting to either the scope or the spirit of the example embodiments.

As discussed previously, in HetNet deployments, as well as other deployment scenarios, such as range extension, a level of interference experienced on the PBCH (as well as other broadcast channels and signals) may be high. According to the 3GPP LTE Release 10 technical standards, a requirement for decoding PBCH transmissions is a 1 percent miss error rate at −5 dB signal-to-noise ratio (SNR) for certain channel conditions. Although the SNR value may seem low, several mechanisms for controlling interference in HetNet deployments may allow the communications system to operate at such levels of interference.

Figure 1:
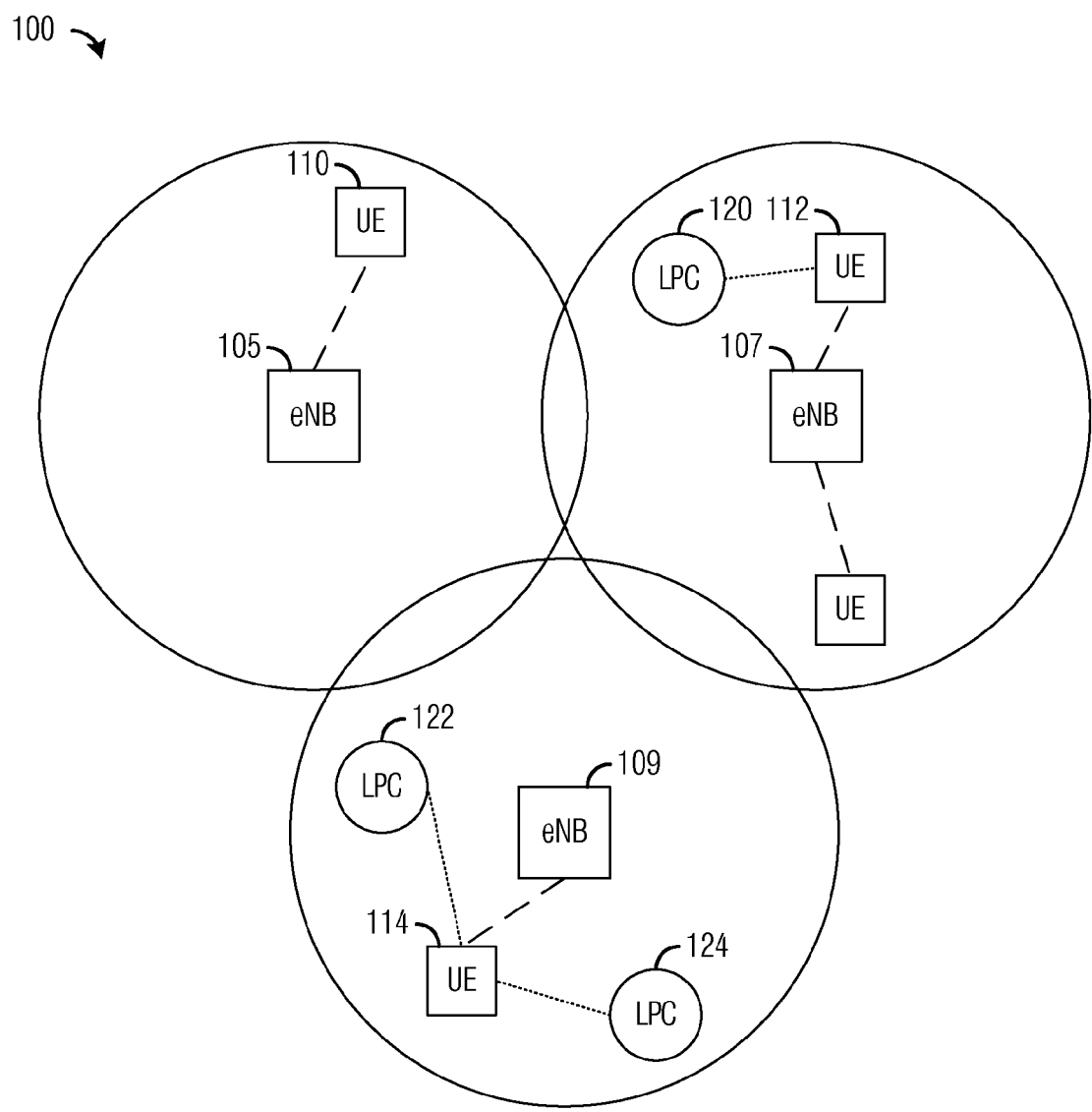
FIG. 1 illustrates an example prior art heterogeneous network.
Figure 2A:
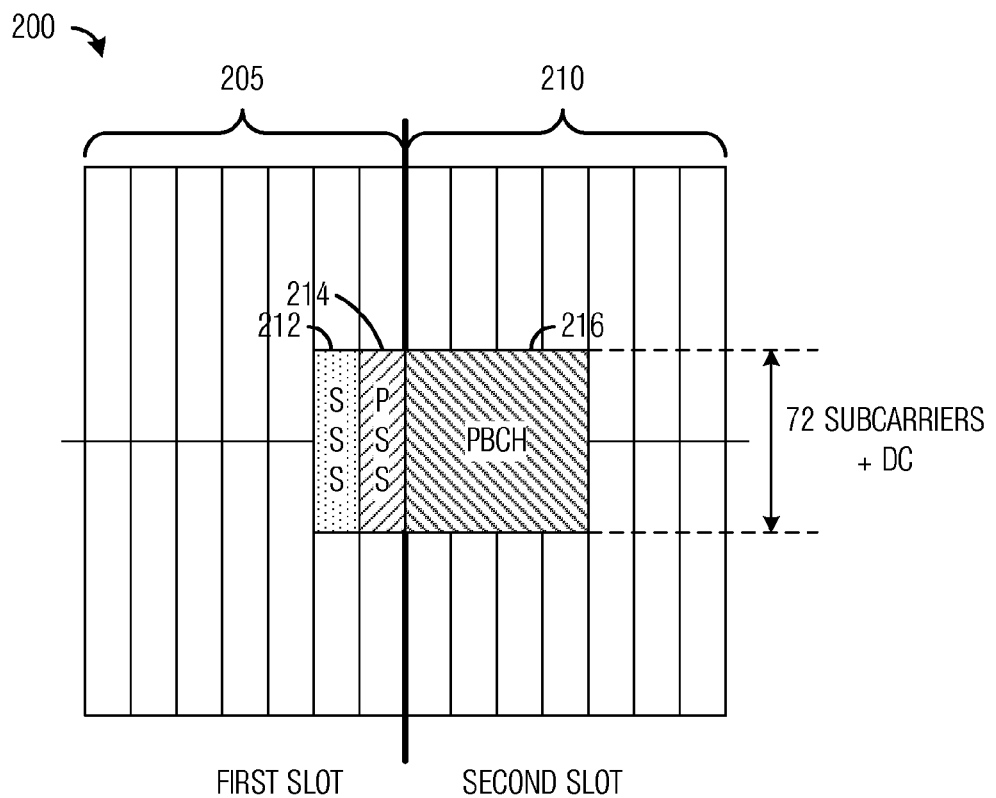
FIG. 2a illustrates an example diagram of a subframe of a 3GPP LTE Release 10 compliant communications system configured for FDD operation when the PBCH is present in the subframe according to example embodiments described herein.

According to the 3GPP LTE Release 10 technical standards, the PBCH is located about the center frequency of an orthogonal frequency division multiplexed (OFDM) frame, such as shown in FIG. 2a. Also located at the center frequency is a DC subcarrier that is unoccupied. When a 3GPP LTE Release 10 or earlier release compliant UE searches for the PBCH, it scans the entire bandwidth with a 100 kHz granularity and blindly looks at blocks of 73 subcarriers (72 subcarriers and the DC subcarrier).

In a 3GPP LTE compliant communications system, subcarriers are organized as groups of resource blocks (RBs), wherein each RB comprises 12 subcarriers. Since each subcarrier is 15 kHz wide, an RB occupies (spans) 180 kHz. Table 1 illustrates the RB to system bandwidth relationship for downlink bandwidths of such a system. It is noted that for system bandwidths with an odd number of RBs, the 72 subcarriers used for the PBCH occupy seven RBs, while six RBs are used for bandwidths with an even number of RBs.

TABLE 1

RB relationship to system bandwidth.

| Bandwidth, MHz | Number of RBs in BW (#RB) | Number of RBs Used for PBCH | Location of RBs containing PBCH |
|---|---|---|---|
| 1.4 | 6 | 6 | 0-5 |
| 3 | 15 | 7 | 4-10 |
| 5 | 25 | 7 | 9-15 |
| 10 | 50 | 6 | 22-27 |
| 15 | 75 | 7 | 34-40 |
| 20 | 100 | 6 | 47-52 |

As an example, one mechanism for reducing interference may involve the control of physical downlink control channel (PDCCH) usage by sending the PDCCH in some subframes for a macro layer (i.e., the planned network layer) while sending the PDCCH in some other subframes for a low power layer (i.e., the LPC network layer). In other words, the PDCCH for the different layers are sent on different subframes to avoid interference. Another mechanism for reducing interference may involve a partitioning of data resources. These two illustrative examples show how the level of interference between the macro layer and the low power layer may be efficiently managed.

However, for the PBCH, as well as some other broadcast channels and signals, no such mechanism has been discussed, and very high interference can be experienced at the UE on these channels and signals. For example, high interference may occur when a LPC node is located close to an eNB. In a synchronized network deployment, the UE receives the PBCH from the eNB and the LPC at the same time. However, since the eNB transmits at a much higher power than the LPC, the interference due to the PBCH transmission from the eNB may prevent the UE from being able to reliably decode the PBCH sent by the LPC.

Techniques such as subframe numbering offset between the low power layer and the macro layer may be used to reduce interference. However, due to subframe use restrictions, the number of available subframe offsets may be limited, thereby limiting the possible amount of interference reduction. This is notably the case for a 3GPP LTE compliant communications system configured for TDD operation. For instance, consider TDD Configuration Five which is defined as "DSUDD DDDDD" where "D", "U", and "S" denote a Downlink (DL) subframe, Uplink (UL) subframe, and Special subframe, respectively. Since simultaneous UL and DL transmissions from neighboring cells may cause interference, subframe shifting is generally not possible without increasing the UL/DL interference.

Another possible technique to reduce interference may be to use advanced interference management techniques, such as interference suppression (IS). However, since the PBCH and some other broadcast channels and/or signals are typically decoded first by UEs, it may be difficult to apply such advanced techniques when the UEs know little about the communications system. In such a situation, a relocatable broadcast channel may be used, wherein the broadcast channel comprises the PBCH, the PSS, the SSS, and so forth.

FIG. 2a illustrates a diagram of a subframe 200 of a 3GPP LTE Release 10 compliant communications system configured for FDD operation when the PBCH is present in the subframe. Generally, the PBCH is present in subframe zero of a frame. Subframe 200 includes a first slot 205 and a second slot 210. In first slot 205, signals, such as SSS 212 and PSS 214, may be transmitted, while in second slot 210, channels, such as PBCH 216, may be transmitted along with other information and/or data.

According to the 3GPP LTE Release 10 technical standards, the PBCH, as well as the SSS and the PSS, may be transmitted at a fixed frequency as well as at fixed times of subframe 200. As shown in FIG. 2a, PBCH 216 occupies a total of 73 subcarriers (72 subcarriers plus one DC subcarrier), with the DC subcarrier remaining unoccupied. The DC subcarrier is also the center frequency of the bandwidth and the carrier frequency. Furthermore, a band may be considered to be an occupied band if one or more subcarriers in the band is used to carry data and/or information.

With SSS 212, PSS 214, and PBCH 216 being fixed in frequency and time, a high interference situation may arise when there are a large number of communications controllers (e.g., high power macro cells, and/or LPCs, such as femto cells, pico cells, RNs, and so forth) all transmitting at the same time and in the same frequency.

Figure 2B:
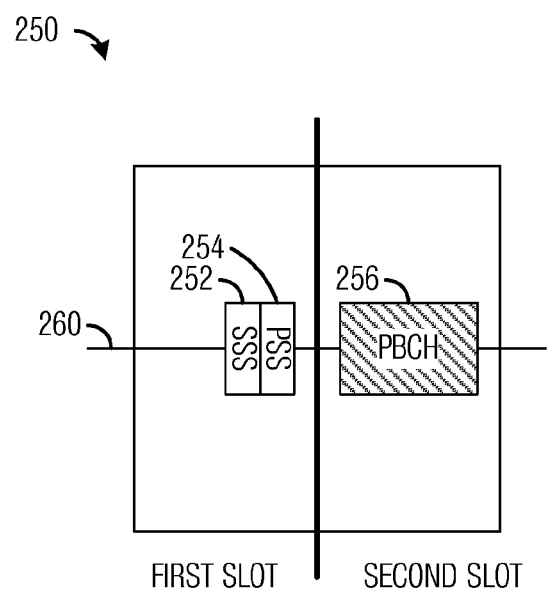
FIG. 2b illustrates an example diagram of a simplified subframe when the PBCH is present in the subframe according to example embodiments described herein

FIG. 2b illustrates a diagram of a simplified subframe 250. Subframe 250 includes a SSS 252, a PSS 254, and a PBCH 256, with SSS 252, PSS 254, and PBCH 256 being centered about a center frequency 260, which may be the DC subcarrier in a 3GPP LTE Release 10 compliant communications system.

According to an example embodiment, one way to reduce interference is to increase a number of available locations (e.g., sets of time and/or frequency resources) that may be used to transmit the SSS, PSS, PBCH, as well as other broadcast channels and/or signals. As an example, if the number of available locations to transmit the PBCH is increased from one (as specified in the 3GPP LTE Release 10 technical standards) to two, a probability of interference may be decreased by 50 percent. Furthermore, by coordinating the PBCH (as well as other broadcast channels and/or signals) assignment at different communications controllers, it is possible to avoid interference on the PBCH (as well as other broadcast channels and/or signals) between neighboring nodes.

For illustrative purposes, consider an exemplary selection of possible center frequencies (subcarriers) for PBCHs. The location of the PBCH is required to keep the 100 kHz raster granularity for UE scanning. Based on this requirement, the possible locations for the center frequency can be determined for each system bandwidth. Based on the subcarrier spacing, the frequency spacing between any two center frequencies is 300n kHz, which corresponds to 20n subcarriers, when n=0, 1, . . . . The spacing is based on a formula expressible as:

Find all m such that m×subcarrier spacing in Hz mod 100 kHz=0 subject to bandwidth of the communications system, where m is the subcarrier number. This is equivalent to 15000m mod 100000=0. The set of values m that satisfies this relation is m=20n.

Given the spacing requirement, it may be possible to enumerate the set of center frequency locations for a given bandwidth, as presented in Table 2. A second column in Table 2 may be obtained by the relation 12×#RB+1 and indicates the total number of subcarriers including a subcarrier containing the center frequency (referred to hereinafter as subcarrier$_{CF}$) for a bandwidth. A third column indicates a subcarrier$_{CF}$ for a bandwidth expressed as a subcarrier number (represented herein as a zero based number) and is obtained by a relation expressible as 6×#RB. A fourth column expresses possible subcarrier$_{CF}$ locations as a function of the location of the DC subcarrier. The values of n (an integer value) are chosen such that the possible locations are non negative and less than the number of subcarriers in the bandwidth. A fifth column excludes certain possible subcarrier$_{CF}$ locations based on a number of rules:

1. subcarrier$_{CF}$−36≥0;
2. subcarrier$_{CF}$+36<total subcarriers in bandwidth; and
3. |subcarrier$_{CF}$−DC location|≥36.

The first rule and the second rule ensure that the subcarriers associated with PBCH do not cross an allocated frequency span. The third rule ensures that the subcarriers associated with PBCH do not cross the actual DC subcarrier. Based on these rules, the first subcarrier$_{CF}$ on either side of the DC subcarrier is excluded. The last column is a number of valid subcarrier$_{CF}$ locations.

TABLE 2

Valid subcarrier$_{CF}$ locations as a function of the system bandwidth.

| Number of RBs in BW | Total subcarriers | Carrier frequency expressed as subcarrier | Possible subcarrier$_{CF}$ Locations | Valid subcarrier$_{CF}$ Locations | Number of valid subcarrier$_{CF}$ Locations |
|---|---|---|---|---|---|
| 6 | 73 | 36 | 36 ± 20n, n = 1 | N/A | 0 |
| 15 | 181 | 90 | 90 ± 20n, n = 1, . . . , 4 | 90 ± 20n, n = 2 | 2 |
| 25 | 301 | 150 | 150 ± 20n, n = 1, . . . , 7 | 150 ± 20n, n = 2, . . . , 5 | 8 |
| 50 | 601 | 300 | 300 ± 20n, n = 1, . . . , 15 | 300 ± 20n, n = 2, . . . , 13 | 24 |
| 75 | 901 | 450 | 450 ± 20n, n = 1, . . . , 22 | 450 ± 20n, n = 2, . . . , 20 | 38 |
| 100 | 1201 | 600 | 600 ± 20n, n = 1, . . . , 30 | 600 ± 20n, n = 2, . . . , 28 | 54 |

It is possible the create a set of subcarrier$_{CF}$ locations based on information illustrated in Table 2 so that subcarriers associated with a PBCH location do not overlap with other subcarriers associated with another PBCH location. Table 3 lists the locations of the subcarrier$_{CF}$ locations whose subcarriers (spanning 36 subcarriers on either side of the location) do not overlap with subcarriers from a different subcarrier$_{CF}$ location or from the actual DC subcarrier (carrier frequency).

TABLE 3

Non overlapping center frequency locations as a function of the system bandwidth.

| Number of RBs in BW | Center frequency location | Non overlapped center frequency locations | Number of these locations |
|---|---|---|---|
| 6 | 36 | N/A | 0 |
| 15 | 90 | N/A | 0 |
| 25 | 150 | 150 ± 80n, n = 1 | 2 |
| 50 | 300 | 300 ± 80n, n = 1, . . . , 3 | 6 |
| 75 | 450 | 450 ± 80n, n = 1, . . . , 5 | 10 |
| 100 | 600 | 600 ± 80n, n = 1, . . . , 7 | 14 |

Since an RB is 180 kHz (12 subcarriers) wide and the PBCH occupies 73 subcarriers, including the subcarrier$_{CF}$ subcarrier, each PBCH has a total bandwidth of about 1.1 MHz. Because of the 100 kHz granularity, and the fact that the PBCH does not occupy an integer number of RBs, there might be some small amount of resource waste, since some RBs would need to be kept empty. The resource waste is however limited, since the PBCH is sent relatively infrequently. However, if the resource waste is a concern, it may be possible to have the UE simply ignore resources used for the PBCH in a partially occupied RB, just as it is done for the 3GPP LTE Release 10 compliant UEs. It is noted that the process would also be more involved since puncturing the REs occupied by the PBCH depends on the PBCH location. However, a systematic rule can be defined for rate matching.

Since the bandwidth occupied by the PBCH is relatively large (more than 1 MHz), for smaller bandwidth deployments, there might be very few unique and/or non-overlapping locations for the PBCH. The relatively few PBCH locations might result in bursty PBCH to PBCH interference, and only partial interference reduction. However, for larger bandwidths (5 MHz and over, as an example), which are generally of higher practical interest for deployment of a multi-layer LTE system, there is no such issue.

If the requirement of maintaining the 100 kHz raster is lifted, a potential solution can be to locate the PBCH at the top or bottom of the bandwidth. In the potential solution, 72 subcarriers can be used, with the 73rd subcarrier at the end being not transmitted. The receiver may insert unknown zero likelihood values, as an example, in a decoder in place of the 73rd subcarrier. The insertion of unknown zero likelihood values may increase the minimum required SINR value, but should be more than offset by the reduction in interference level. In this example, subcarrier 36 (zero-based numbering) would represent the PBCH center frequency when the PBCH is located at the bottom of the bandwidth.

FIG. 3a illustrates a diagram of a first subframe 300. First subframe 300 illustrates exemplary possible locations for SSS, PSS, and PBCH. As shown in FIG. 3a, all (SSS, PSS, and PBCH) may be relocated, with possible locations for the SSS and the PSS including a location that spans the DC subcarrier (location 305), a location that is above the DC subcarrier and not spanning the DC subcarrier (location 306), and a location that is below the DC subcarrier and not spanning the DC subcarrier (location 307). Similarly, possible locations for the PBCH include a location that spans the DC subcarrier (location 310), a location that is above the DC subcarrier and not spanning the DC subcarrier (location 311), and a location that is below the DC subcarrier and not spanning the DC subcarrier (location 312). "Below the DC subcarrier" is equivalent to lower in frequency. Analogously, "above the DC subcarrier" is equivalent to higher in frequency. Although FIG. 3a illustrates three potential locations for each of the broadcast channels and/or signals, it is possible to have fewer or more potential locations. Having alternate locations for the PSS, SSS, and PBCH allows for the control of interference for the PSS, SSS, and PBCH. However, on occasion, detrimental levels of interference may be present at one of the PSS, SSS, or PBCH.

Although the SSS and the PSS may be shown as being transmitted together within the same frequency location, the SSS and the PSS may actually be transmitted separately in different locations, depending on communications controller selection and/or communications system requirements.

From the possible locations for the SSS, the PSS, and the PBCH, a communications controller (e.g., a high power macro cell or a LPC) may select locations for the SSS, the PSS, and the PBCH, and transmit accordingly. As an example, the communications controller may select location 306 for the SSS and the PSS, and location 312 for the PBCH. At a UE, once the UE finds the SSS and the PSS, the UE may perform blind detection on a possible PBCH location (as potentially indicated by the communications controller) to find the PBCH. Alternatively, the PBCH may comprise information indicating the central frequency of the transmission band when the PBCH is not transmitted at the middle of the frequency band.

FIG. 3b illustrates a diagram of a second subframe 330. Second subframe 330 illustrates exemplary possible locations for SSS, PSS, and PBCH. As shown in FIG. 3b, only the SSS and the PSS are moved, with possible locations for the SSS and the PSS including a location that spans the DC subcarrier (location 335), a location that is above the DC subcarrier and not spanning the DC subcarrier (location 336), and a location that is below the DC subcarrier and not spanning the DC subcarrier (location 337). Having alternate locations for the PSS and the SSS allow for the control of interference for the PSS and the SSS.

Figure 3C:
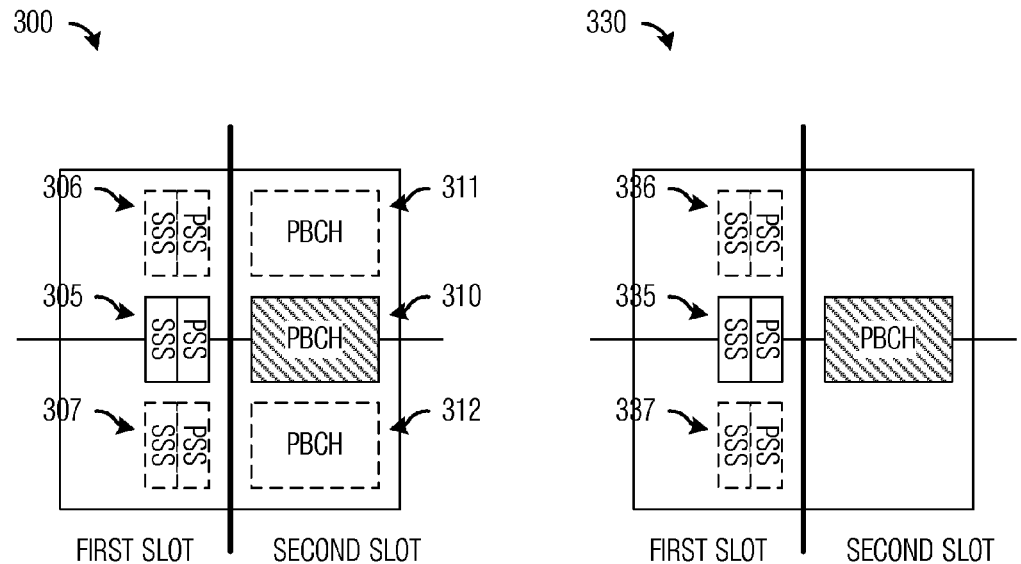
Figure 3C:
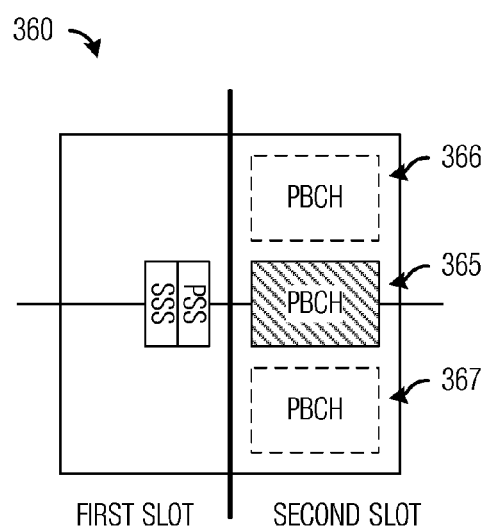

FIG. 3c illustrates a diagram of a third subframe 360. Third subframe 360 illustrates exemplary possible locations for SSS, PSS, and PBCH. As shown in FIG. 3c, only the PBCH is moved, with possible locations for the PBCH including a location that spans the DC subcarrier (location 365), a location that is above the DC subcarrier and not spanning the DC subcarrier (location 366), and a location that is below the DC subcarrier and not spanning the DC subcarrier (location 367). Having alternate locations for the PBCH allows for the control of interference for the PBCH.

Figure 4A:
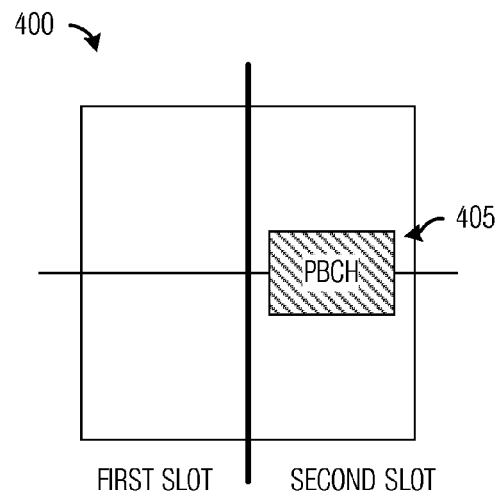

FIG. 4a illustrates a diagram of a first subframe 400 with a first exemplary location of a PBCH. First subframe 400 includes a PBCH that is transmitted at location 405, wherein location 405 encompasses the DC subcarrier. Although shown in FIG. 4a as being centered about the DC subcarrier, location 405 may not need to be centered about the DC subcarrier. An advantage of first subframe 400 is that legacy communications devices may be able to detect the PBCH transmitted in location 405. A legacy communication device may determine that the DC subcarrier (i.e., a center of the occupied band) corresponds to location 405 upon detecting the PBCH.

Figure 4B:
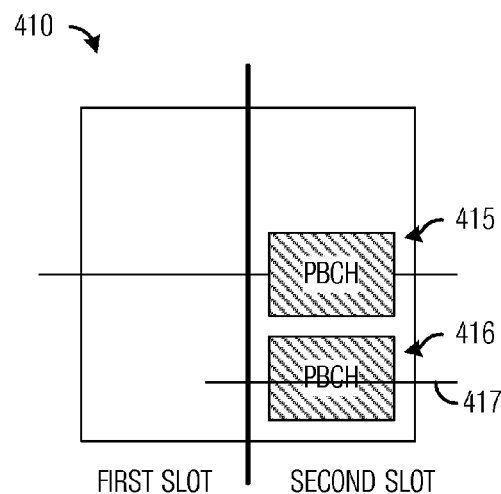

FIG. 4b illustrates a diagram of a second subframe 410 with a second exemplary location of a PBCH. Second subframe 410 includes a PBCH that is transmitted at two locations: location 415 and location 416. Location 415 encompasses the DC subcarrier and location 416 is fully below the DC subcarrier. Location 416 is centered about a PBCH center frequency 417. Although shown in FIG. 4b as being centered about the DC subcarrier, location 415 may not need to be centered about the DC subcarrier. An advantage of second subframe 410 is that legacy communications devices may be able to detect the PBCH transmitted in location 415.

Figure 4C:
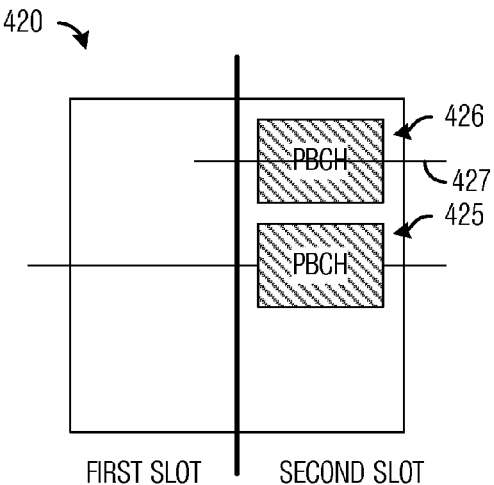

FIG. 4c illustrates a diagram of a third subframe 420 with a third exemplary location of a PBCH. Third subframe 420 includes a PBCH that is transmitted at two locations: location 425 and location 426. Location 425 encompasses the DC subcarrier and location 426 is fully above the DC subcarrier. Location 426 is centered about a PBCH center frequency 427. Although shown in FIG. 4c as being centered about the DC subcarrier, location 425 may not need to be centered about the DC subcarrier. An advantage of third subframe 420 is that legacy communications devices may be able to detect the PBCH transmitted in location 425.

FIG. 4d illustrates a diagram of a fourth subframe 430 with a fourth exemplary location of a PBCH. Fourth subframe 430 includes a PBCH that is transmitted at location 435, which is fully below the DC subcarrier. Location 435 is centered about a PBCH center frequency 436. Generally, since the PBCH is designed to occupy 73 subcarriers (which can be indexed from 0 to 72), the center of the PBCH (PBCH center frequency 436) is subcarrier 36. The subcarrier content for that center is typically set to 0. The subcarrier content at PBCH center frequency 436 may be unoccupied (e.g., set to zero). Although the discussion of the example embodiments focuses on PBCH center frequency 436 being an unoccupied subcarrier, in practice, the unoccupied subcarrier may be located elsewhere within the frequency band.

FIG. 4e illustrates a diagram of a fifth subframe 440 with a fifth exemplary location of a PBCH. Fifth subframe 440 includes a PBCH that is transmitted at location 445, which is fully above the DC subcarrier. Location 445 is centered about a PBCH center frequency 446.

FIG. 4f illustrates a diagram of a sixth subframe 450 with a sixth exemplary location of a PBCH. Sixth subframe 450 includes a PBCH that is transmitted at two locations: location 455 and location 456. Neither location 455 nor location 456 encompasses the DC subcarrier. Location 455 is centered about a PBCH center frequency 457 and location 456 is centered about a PBCH center frequency 458. Although shown with one location above the DC subcarrier and one location below the DC subcarrier, both locations may be above the DC subcarrier or both locations may be below the DC subcarrier.

FIG. 4g illustrates a diagram of a seventh subframe 460 with a seventh exemplary location of a PBCH. Seventh subframe 460 includes a PBCH that is transmitted at three locations: location 465, location 466, and location 467. Location 465 encompasses the DC subcarrier, while location 466 is fully above the DC subcarrier and location 467 is fully below the DC subcarrier. Location 466 is centered about a PBCH center frequency 468 and location 467 is centered about a PBCH center frequency 469. Although shown in FIG. 4g as being centered about the DC subcarrier, location 465 may not need to be centered about the DC subcarrier. Furthermore, although shown with location 466 above the DC subcarrier and location 467 below the DC subcarrier, locations 466 and 467 may be above the DC subcarrier or both locations may be below the DC subcarrier. An advantage of seventh subframe 460 is that legacy communications devices may be able to detect the PBCH transmitted in location 465.

Although FIGS. 4a through 4g provide illustrative examples of possible locations for the PBCH, similar locations for the SSS and the PSS (as well as other broadcast channels and/or signals) also exist but are not illustrated in FIGS. 4a through 4g to maintain simplicity of the figures. Therefore, the discussion of possible locations for the PBCH should not be construed as being limiting to either the scope or the spirit of the example embodiments.

As discussed above, providing the ability to utilize different locations for transmission of the PBCH, as well as the SSS, the PSS, and other broadcast channels and signals, may help to reduce the interference level in a communications system. Another technique that may be used to help reduce the interference level is to control the transmit power level based on operating conditions.

The information content for the PBCH may be generated every 40 milliseconds (or equivalently four radio frames). A process of encoding, scrambling, modulating, layer mapping, precoding, and so forth, generates a block of complex symbols. The block may then be divided into fourths, wherein a first fourth is assigned an index of zero. The j-th fourth may be transmitted on subframe zero of frame 4i+j, where i=0, ..., 255, and j=0, ..., 3, wherein i represents the block number. In typical operations as described in the 3GPP LTE Release 10 technical standards, each block may be transmitted at the same power level.

To manage interference, the power level may be adjusted on a block-by-block basis. As an example, a first eNB may transmit every even-numbered block at power level $p_{even}$ while transmitting every odd-numbered block at power level $p_{odd}$. A second eNB may use power levels $p'_{even}$ and $p'_{odd}$, respectively. Coordinating the values of $p_{even}$, $p'_{even}$, $p_{odd}$, and $p'_{odd}$ by a network can be used to manage interference.

Figure 5:
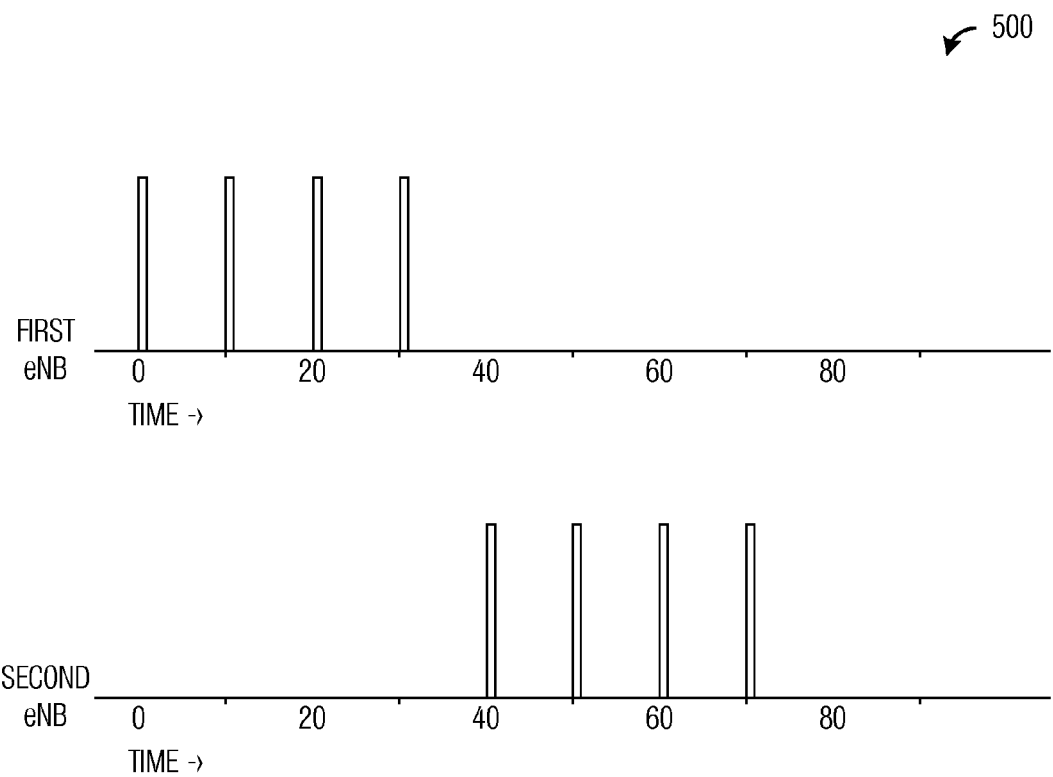
FIG. 5 illustrates example transmissions from a first eNB and a second eNB when the eNBs are utilizing transmit power control according to example embodiments described herein.

For discussion purposes, consider an illustrative example wherein $p_{even}$=on, $p'_{even}$=0, $p_{odd}$=0, and $p'_{odd}$=on, where "on" represents a nominal transmit level, a UE would receive PBCH transmissions from the first eNB the first 40 millisecond (ms) of every 80 ms period. Likewise, the same UE would receive PBCH transmissions from the second eNB the last 40 ms of every 80 ms period. FIG. 5 illustrates transmissions from the first eNB and the second eNB when the eNBs are utilizing transmit power control as described above.

In the illustrative example, the second eNB transmits the PBCH at zero power when the first eNB transmits at full power, and conversely, the first eNB transmits the PBCH at zero power when the second eNB transmits at full power. Although described for two eNBs, the same can apply to other situations, such as for two LPCs or one LPC and one eNB, and so on.

In another illustrative example, consider a situation with a first eNB interfering with UE attached to a second eNB, but not the reverse. A possible solution to reduce interference may involve the first eNB transmitting at a reduced power on some radio frames, while the second eNB may maintain the same nominal power level. In this solution, the UE attached to the second eNB may experience reduced interference, while a UE attached to the first eNB may experience a slightly increased decoding time for PBCH information due to the lower transmit power.

In addition to utilizing different frequency domain locations of the PBCH, the SSS, and/or the PSS (as well as other broadcast channels and signals) to help reduce interference, it is also possible to use different time domain locations of the PBCH, the SSS, and/or the PSS to help reduce interference. Furthermore, it is also possible to utilize both different frequency domain locations and different time domain locations to help reduce interference.

Figure 6A:
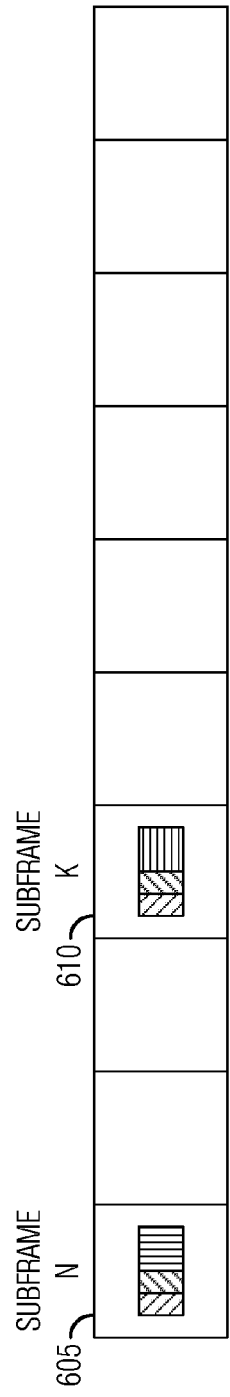
FIGS. 6a and 6b illustrate example diagrams of sequences of consecutive subframes, wherein the SSS, PSS, and/or PBCH are located at different time domain locations to help reduce interference according to example embodiments described herein.
Figure 6B:
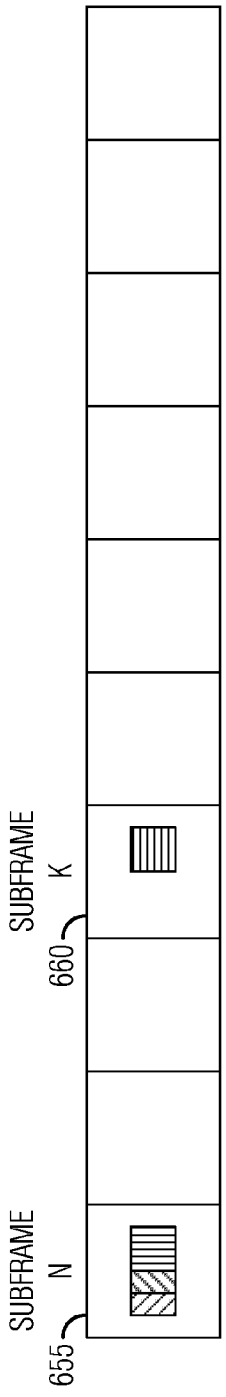

FIGS. 6a and 6b illustrate diagrams of sequences of consecutive subframes (600 for FIGS. 6a and 650 for FIG. 6b), wherein the SSS, PSS, and/or PBCH are located at different time domain locations to help reduce interference. Sequence of consecutive subframes 600 illustrates a first time domain location for the SSS, the PSS, and/or the PBCH in subframe N 605 in addition to a second time domain location for the SSS, the PSS, and/or the PBCH in subframe K 610. As shown in FIG. 6a, both subframe N 605 and subframe K 610 may be used to send the SSS, the PSS, and the PBCH. Sequence of consecutive subframes 650 illustrates a third time domain location for the SSS, the PSS, and/or the PBCH in subframe N 655 in addition to a fourth time domain location for the SSS, the PSS, and/or the PBCH in subframe K 660. As shown in FIG. 6b, subframe N 655 may be used to send the SSS, the PSS, and the PBCH, while subframe K 660 may be used to send only the PBCH.

For the PBCH, subframe N may correspond to subframe zero in both FDD and TDD communications systems, while for the PSS, subframe N is zero and five for FDD communications systems and one and six for TDD communications systems, and for the SSS, subframe N is zero and five for both FDD and TDD communications systems. However, the value of N may be also be equal to other possible subframe numbers, such as K (as in subframe K shown in FIGS. 6a and 6b), as long as K is not equal to N.

In general, a subframe K in a FDD communications system may be one of any subframes selected from a set comprising subframe (1, 2, 3, 4, 5 {for a specific case of the PSS and/or the SSS without this subframe}, 6, 7, 8, 9). If ABS or Multi-Media Broadcast over a Single Frequency Network (MB-SFN) subframes are used at an interferer communications controller (for example, a high power macro cell) to reduce interference to victim communications devices, a preferred subframe K can be one of any subframes selected from a set comprising subframe (1, 2, 3, 6, 7, 8).

Similarly, a subframe K in a TDD communications system may be one of any subframes selected from a set comprising
subframe 5 for UL/DL configuration zero;
subframe 4, 9 for UL/DL configuration one;
subframe 3, 4, 8, 9 for UL/DL configuration two;
subframe 7, 8, 9 for UL/DL configuration three;
subframe 4, 7, 8, 9 for UL/DL configuration four;
subframe 3, 4, 7, 8, 9 for UL/DL configuration five; and
subframe 9 for UL/DL configuration six.
As an example, a preferred value for K in TDD communications systems is nine.

According to an example embodiment, subframe K may be configured or coordinated through radio resource control (RRC) signal or Operations, Administration, and Management (OAM) techniques. Hence, a high degree of flexibility may be achieved. Alternatively, subframe K may be fixed or pre-specified to avoid having to signal the value of K. Then, ABS and/or MBSFN subframe(s) may be configured at the interferer communications controller to reduce interference.

According to an example embodiment, in order to allow legacy UEs to detect and decode the PSS, the SSS, and/or the PBCH in a subframe specified for a legacy communications system, the PSS, the SSS, and/or the PBCH may be sent and/or received in both subframe N and subframe K. The legacy UE can detect and decode the PSS, the SSS, and/or the PBCH in the subframe defined for the legacy communications system (e.g., subframe N), while a UE capable to detecting and decoding the PSS, the SSS, and/or the PBCH located in other subframes may detect and decode the PSS, the SSS, and/or the PBCH in the other subframe (e.g., subframe K).

Figure 7:
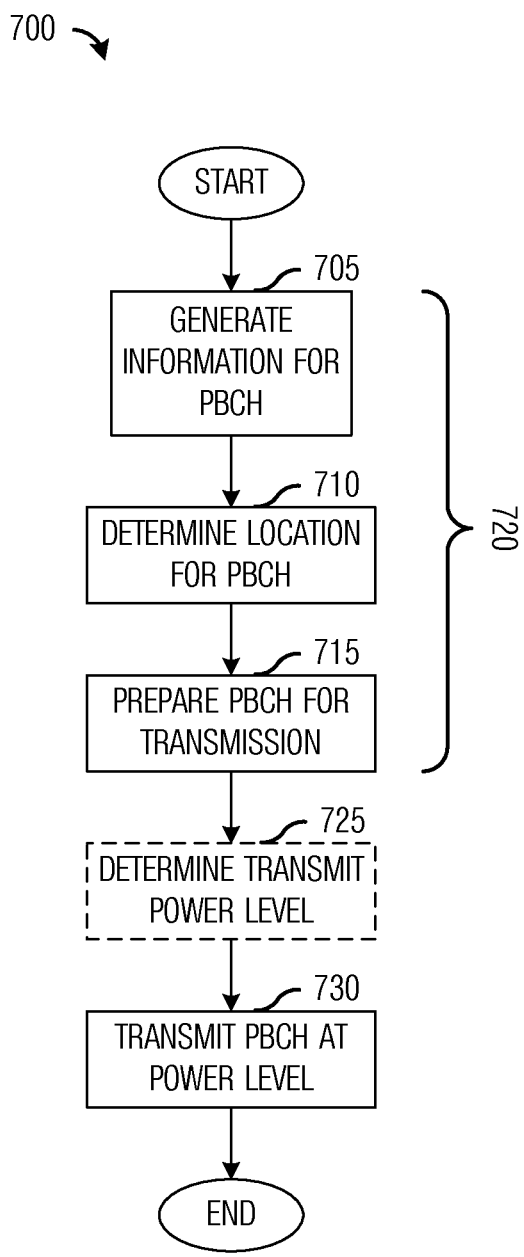
FIG. 7 illustrates an example flow diagram of eNB operations in transmitting a PBCH according to example embodiments described herein.

FIG. 7 illustrates a flow diagram of eNB operations 700 in transmitting a PBCH. eNB operations 700 may be indicative of operations occurring in an eNB of a communications system as the eNB prepares and transmits a PBCH to UEs served by the eNB, wherein the PBCH may be located in any of a variety of locations. Although the discussion focuses on an eNB (i.e., a macro cell), eNB operations 700 may also apply to LPCs. eNB operations 700 may occur while the eNB is in a normal operating mode. Although the discussion focuses on the eNB preparing and transmitting the PBCH, the example embodiments provided herein may be operable with other broadcast channels and signals, such as the SSS, the PSS, and so forth.

eNB operations 700 may begin with the eNB generating information to be included in the PBCH (block 705). According to an example embodiment, the information may include information that may be important for initial access to the eNB, such as downlink system bandwidth, physical HARQ indicator channel structure, system frame number, identification information, and so forth. The information may also include an indicator of the location of the PBCH.

After generating the information for the PBCH (including the indicator of the location of the PBCH), the eNB may determine (for example, by mapping) the location of the PBCH to actual resources (e.g., in terms of time resources, frequency resources, or a combination thereof) (block 710). For example, consider an illustrative example wherein the indicator is represented as a four-bit value (which may therefore indicate up to 16 different location values), if carrier_freq=2.5 GHz, offset=1.2 MHz, and indicator=12, then $PBCH_{CF}$=2.5 GHz−1.2 MHz*(12-7)=2.494 GHz. This example illustrates the relationship between the carrier frequency (e.g., DC subcarrier) and the PBCH center frequency $PBCH_{CF}$ (location of the PBCH) using the indicator.

In order to manage the PBCH interference in either HetNet or HomoNet deployments, eNBs deployed close to each other may place their broadcast channels at different locations in frequency and/or time. While the placement may be done manually, a preferred approach may be to use an automatic mechanism, with the placement being based on some sort of identification information for the communications controllers, e.g., the frequency (or time or frequency and time) location dependent on the cell ID.

The eNB may prepare the PBCH, i.e., the information to be transmitted in the PBCH, for transmission (block 715). Preparing the PBCH for transmission may include applying a number of operations to the information to be transmitted, including but not limited to encoding, scrambling, modulating, layer mapping, precoding, subcarrier mapping, or combinations thereof. Subcarrier mapping may occur once resources, e.g., time-frequency resources, have been determined. As an example, the prepared PBCH block may be placed in determined time-frequency resources. The frequency resources may be a block of contiguous subcarriers with the center frequency of the PBCH being one subcarrier from the block of contiguous subcarriers. The prepared PBCH block may be placed in the block of contiguous subcarriers starting at a particular time resource. The placing of the prepared PBCH block may skip over the PBCH center frequency (or any other unoccupied subcarriers), with a null or zero value being written in the PBCH center frequency or the unoccupied subcarriers.

Although the discussion of the example embodiments focuses on the PBCH center frequency being an unoccupied subcarrier, in practice, the unoccupied subcarrier may be located elsewhere within the frequency band.

Furthermore, the placing of the prepared PBCH block may also skip over locations reserved for reference symbols. As an illustrative example, the placing of the prepared PBCH block may insert the PBCH block by starting in the lowest time index and the lowest subcarrier index of the determined time-frequency resources and then filling first over the frequency resources (with skipping over locations for reference symbols and the PBCH center frequency) and then repeating the filing over the frequency resources for a next time index.

Collectively, generating information for the PBCH (block 705), determining a location for the PBCH (block 710), and preparing the PBCH for transmission (block 715) may be referred to as generating the PBCH (blocks 720).

Furthermore, the transmit power level of the PBCH may be determined if transmit power control is being used to reduce interference (block 725). According to an example embodiment, transmit power control may or may not be used in conjunction with changing the location of the PBCH (as well as other broadcast channels and signals) to help reduce interference. Coordination with other eNBs in the communications system may be performed to determine the transmit power level(s). The determination of the transmit power level(s) may be based on information such as signal and/or interference measurements from UEs and/or eNBs, historical usage information, traffic patterns and/or load, and so on.

Alternatively, a centralized controller may be present in the communications system to determine the transmit power level(s) for the communications controllers, e.g., the eNBs, in the communications system. Alternatively, a number of localized controllers may be present in the communications system and each may determine the transmit power level(s) for a subset of communications controllers in the communications system.

For example, an on-off transmit power level gating technique, such as described previously, may be used to determine the transmit power level. In the on-off transmit power level gating technique (as well as potentially in other transmit power level techniques), the transmit power level may be set based on a block number (or frame number, time, or some other sequencing number) of the information to be transmitted.

According to an example embodiment, depending on the nature of the deployment, a system designer may select a transmit power level for each block from each eNB to control interference. As a factor to consider, transmissions from a LPC usually have little impact on communications from a high power macro cell. Therefore, it may not be necessary to gate off the PBCH transmissions from LPCs. On the other hand, depending on the location of the LPC, it may be possible for the high power macro cell to transmit its PBCH at a lower transmit power level so as to not cause significant interference to transmissions of the LPCs. In such a situation, instead of gating off the block transmission, the high power macro cell may transmit the block at a lower transmit power level. Such a technique may help improve the delay for UEs operating in a center of the high power macro cell's coverage area, i.e., cell center users.

The PBCH may then be transmitted (block 730). If the transmit power level is used to help reduce interference (block 725), then the PBCH may be transmitted at the determined transmit power level. If the transmit power level is not used to help reduce interference, then the PBCH may be transmitted at some specified transmit power level, such as at a transmit power level specified in a technical standard or by an operator of the communications system.

According to an example embodiment, the information may also include an indicator of a center frequency of the PBCH. For example, if the PBCH is 3GPP LTE Release 10 compliant, then the center frequency may be equal to zero (i.e., the DC subcarrier). As an illustrative example, the indicator may a four bit value, which may indicate up to 16 different center frequency values. A formula may then be used to compute the center frequency of the PBCH from the indicator and the carrier frequency. An exemplary formula for the center of the PBCH with a four bit indicator may be $$PBCH_{CF} = \begin{cases} \text{carrier\_freq} + \text{offset} * \text{indicator} & \text{if indicator} < 8 \\ \text{carrier\_freq} - \text{offset} * (\text{indicator} - 7) & \text{if indicator} \geq 8, \end{cases}$$

where carrier_freq is the carrier frequency of the communications system, and offset is center frequency offset spacing.

For example, if carrier_freq=2.5 GHz, offset=1.2 MHz, and indicator=12, then $PBCH_{CF}$=2.5 GHz–1.2 MHz* (12–7)=2.494 GHz. The center frequency may be a subcarrier, or a DC subcarrier.

Alternatively, an indicator may indicate a subset of possible PBCH center frequencies out of a set of possible PBCH center frequencies or some multiple of the raster frequency (i.e., 100 kHz in 3GPP LTE Release 10 technical standards). The eNB may have determined the center frequency of the PBCH (or the PSS, the SSS, and/or other broadcast channels and/or signals) based on a number of selection criteria, including a measured amount of interference, information from UEs (such as signal to noise ratio, signal to interference plus noise ratio, reference signal strength measurements, and so on), communications system traffic pattern and/or load, historical information, interference information from other communications controllers (i.e., macro cells, LPCs, and so on), and so forth. The eNB may determine the center frequency of the PBCH a priori and store it for subsequent use. Furthermore, the eNB may repeat the determining of the center frequency periodically (e.g., each time the PBCH is to be transmitted, after a specified number of times the PBCH has been transmitted, after a specified amount of time, and so on), based on performance metrics meeting a threshold, a received instruction to perform the determination of the center frequency, and so on.

An issue to be considered is the management of reference symbols (RS) with relocated PBCHs. To decode the PBCH, reference signals are needed by the UE. A simple solution may be to use the CRS. In the 3GPP LTE Release 8 technical standards, CRS locations within each RB are based on the cell ID. It is noted that the placement of the RB contents in the OFDM grid accounts for the DC subcarrier. Hence, when extracting contents across the DC subcarrier, the UE must account for the DC subcarrier.

For 3GPP LTE Release 9 and later technical standards, the DC subcarrier is not used to carry information and/or signals. The DC subcarrier can then be simply skipped by the UE, and the communications system is designed as if the DC subcarrier was not present. However, with a center frequency, the placement of the reference signal(s) used for PBCH demodulation, such as the CRS, should be considered.

It may be possible to reuse the CRS for the relocated PBCH. A benefit of this solution is that the same algorithm for decoding the PBCH can be used regardless of the PBCH location. However, there are several issues that arise, including which values of the CRS should be used, how the CRS should be placed around the center frequency, and how should the existing CRS pattern be managed with the relocated PBCH.

For the question about the values of the CRS, section 6.10.1 within 3GPP TS 36.211 of the LTE standard contains formulas and/or equations that describe the time and frequency placement of the CRS within each RB and the values of each CRS. Both the frequency placement and the values are functions of the cell ID. Analysis of the formulas and/or equations shows that:

1. A vector of values is produced. The vector has conceptually the same length regardless of the bandwidth.
2. The same section of the vector is used for the actual PBCH (the PBCH with the DC subcarrier). For descriptive purposes, the starting and ending indices of the section are denoted as $m'_{PBCH}{}^{lo}$=104 and $m'_{PBCH}{}^{hi}$=115, respectively. Therefore, in order to retain the compatibility to the actual PBCH, the CRS values for the relocated PBCH should use the set of indices $m'_{PBCH}{}^{x}$, $x \in \{lo, hi\}$.

Given the locations of the center frequency subcarriers presented in Table 2 or from the more restrictive shown in Table 3, a mapping between occupied subcarriers for the PBCH can be determined for a center frequency and an actual DC implementation, and is presented in Table 4.

TABLE 4

Correspondence of subcarriers between an actual DC and a center frequency.

| | Actual DC subcarrier | PBCH Center Frequency |
|---|---|---|
| Center frequency (CF) | $DC_a = N_{SC}^{RB} N_{RB}^{DL}/2$ | $DC_v = N_{SC}^{RB} N_{RB}^{DL}/2 \pm 20n$ |
| Subcarrier below CF (start) | $DC_a - 3N_{SC}^{RB} \Leftrightarrow k_{PBCH}{}^{lo}$ | $DC_v - 3N_{SC}^{RB}$ |
| Subcarrier below CF (end) | $DC_a - 1$ | $DC_v - 1$ |
| Subcarrier above CF (start) | $DC_a + 1$ | $DC_v + 1$ |
| Subcarrier above CF (end) | $DC_a - 3N_{SC}^{RB} \Leftrightarrow k_{PBCH}{}^{hi}$ | $DC_v + 3N_{SC}^{RB}$ |

Given the mapping, a method of populating the regions for the PBCH using a center frequency may consider mapping the DC subcarrier but then shift the contents with the mappings as presented in Table 4.

A consequence of the shift is that preexisting CRS will be overwritten. Hence, subcarriers in the RBs occupied by the relocated PBCH that were originally required to hold CRS may no longer convey CRS. The method may also cause problems for measurements because legacy UEs may not be able to locate the CRS in subframe 0.

It may also be possible to reuse the channel side information RS (CSI-RS) for the relocated PBCH. An issue with the use of the CSI-RS is that it is typically transmitted with low periodicity (every 40 ms, as an example), thus potentially limiting the flexibility and opportunities for UEs to demodulating the relocated PBCH.

It may also be possible to create a broadcast reference signal (BRS). The BRS may be transmitted at known times and frequency locations within the PBCH. The BRS may assume the unoccupied center frequency regardless of PBCH position in frequency domain. In other words, BRS will assume a center frequency when PBCH is not the center of frequency bandwidth.

The BRS would have a benefit of providing a dedicated RS for demodulation, reducing interference, and maintaining measurement capabilities. However, using both the BRS and CRS may introduce some issues. An issue is that BRS collisions with CRS may need to be avoided. Therefore, the BRS should not be in the same symbol as the CRS. Also, since simple processing is needed for processing the PBCH, having the BRS defined for two antennas only should be sufficient. As an illustrative example, if a communications system is configured so that possible PSS, SSS, and PBCH locations as shown in FIG. 3c are used, a single PSS and SSS may support multiple PBCH locations. Therefore, subcarriers may be available for transmitting other signals. In this configuration, locations 306 and 307 (as shown in FIG. 3a) may be used for the BRS instead of the PSS and the SSS. It is noted that in such a case, the rate-matching algorithm needs to take into account all newly transmitted information and/or signal.

A benefit of the BRS is that if the CRS is not transmitted in symbol 0 (no PDCCH), a UE may use BRS for measurement of current cells and neighboring cells. Having a BRS may also prevent a legacy UE from processing the relocated PBCH.

Figure 8:
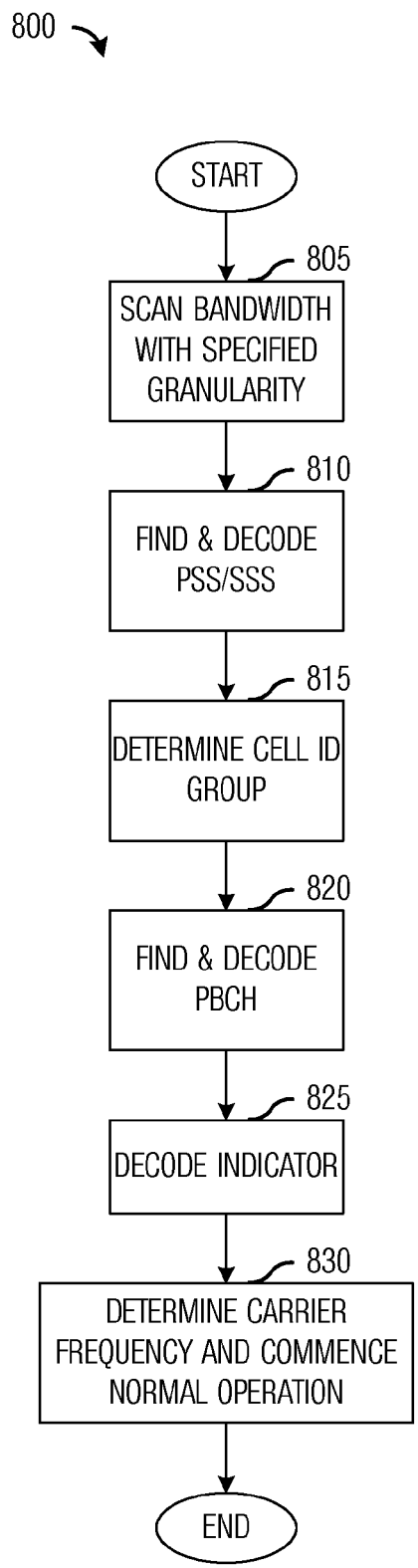
FIG. 8 illustrates an example flow diagram of UE operations in normal UE operations according to example embodiments described herein.

FIG. 8 illustrates a flow diagram of UE operations 800 in normal UE operations. The flow diagram may also describe operations within a relay node (RN). UE operations 800 may be indicative of operations occurring in a UE (or a RN) of a communications system as the UE (or the RN) participates in operations by finding and decoding broadcast channels and/or signals, such as the PSS, the SSS, the PBCH, and so on. UE operations 800 may occur while the UE is in a normal operating mode. Although the discussion focuses on the UE finding and decoding the PSS, the SSS, and the PBCH, to determine information that it needs for normal operations, the example embodiments provided herein may be operable with other broadcast channels and/or signals.

UE operations 800 may begin with the UE scanning a bandwidth at a specified granularity (block 805). As an example, the UE may scan a frequency range starting at 2.4 GHz in 100 kHz increments, i.e., 2.4000 GHz, 2.4001 GHz, 2.4002 GHz, and so on. The UE may use blind detection to try to find the PSS and/or the SSS. Alternatively, if there is no requirement for a 100 kHz raster, the UE may look at the first and last subcarriers of the 72 occupied subcarriers.

For discussion purposes, consider a situation wherein the UE is able to find the PSS and/or the SSS in one of its scans. The UE may then decode the PSS and/or the SSS (block 810). From the decoded PSS and/or the decoded SSS, the UE may be able to determine identification information, e.g., a cell identifier, about the eNB that transmitted the PSS and/or the SSS (block 815).

The UE may find the PBCH location in frequency (and/or the SSS/PSS location in frequency, depending on which broadcast channel has been relocated, for example, the SSS, the PSSS, and the PBCH as shown in FIG. 3a, the SSS and the PSS as shown in FIG. 3b, or the PBCH as shown in FIG. 3c) and decode the PBCH (block 820). The UE may make use of the identification information (e.g., the cell identifier) to determine the location of the PBCH or more precisely, the center frequency of the PBCH (i.e., the PBCH center frequency). For example, the cell identifier may be used in an identifier to location mapping that specifies the location of the PBCH.

In its decoding of the PBCH, the UE may find an indicator of the center frequency of the PBCH and decode the indicator (block 825). With the decoded indicator, the UE may determine the carrier frequency, complete its decoding of information in the PBCH, and commence its operations based on information contained in the PBCH (block 830). Alternatively, if the indicator is not used or is not found, the carrier frequency may be found using blind detection, at the expense of more complexity. The addition of the indicator may lead to a corresponding increase in the length of the PBCH, which may result in the UE performing blind detection over the increased length of the PBCH and the non-increased length of the PBCH.

As an illustrative example, consider a situation wherein the UE detected the PBCH at frequency 2.494 GHz and was able to determine, e.g., by decoding, the contents of the PBCH. Part of the PBCH includes an indicator of the center frequency, which was determined to be 12, for example. The UE may then use a formula to determine the carrier frequency. An exemplary formula may be expressed as $$\text{carrier\_freq} = \begin{cases} PBCH_{CF} - \text{offset} * \text{indicator} & \text{if indicator} < 8 \\ PBCH_{CF} + \text{offset} * (\text{indicator} - 7) & \text{if indicator} \geq 8. \end{cases}$$

Therefore, with the exemplary values presented in the above illustrative example, the carrier frequency is equal to carrier_freq=2.494 GHz+1.2 MHz*(12-7)=2.5 GHz. The UE may then commence operations with a 2.5 GHz carrier frequency.

Figure 9:
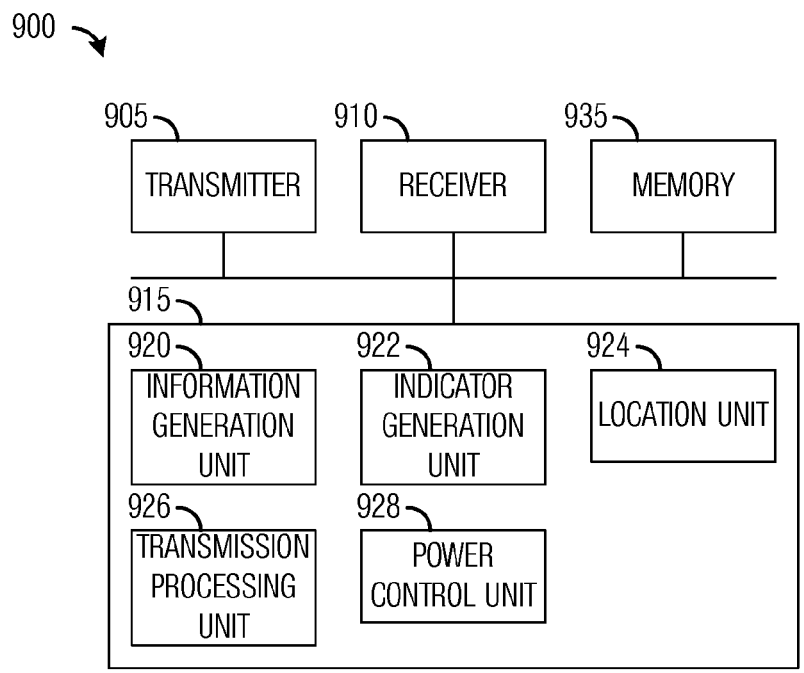
FIG. 9 illustrates an example first communications device according to example embodiments described herein.

FIG. 9 provides an alternate illustration of a communications device 900. Communications device 900 may be an implementation of a communications controller, such as an eNB, high power macro cell, or LPC. Communications device 900 may be used to implement various ones of the embodiments discussed herein. As shown in FIG. 9, a transmitter 905 is configured to transmit information and a receiver 910 that is configured to receive information.

An information generation unit 920 is configured to generate information for a broadcast channel, such as for a PBCH or a PSS or a SSS or some other broadcast channel and/or signal. Information generation unit 920 is also configured to insert subcarriers (occupied or unoccupied). An indicator generation unit 922 is configured to generate an indicator of a location of a PBCH (or some other broadcast channel and/or signal). A location unit 924 is configured to select a location for a PBCH (or some other broadcast channel and/or signal) based on selection criteria, including a measured amount of interference, information from UEs (such as signal to noise ratio, signal to interference plus noise ratio, reference signal strength measurements, and so on), communications system traffic pattern and/or load, historical information, interference information from other communications controllers (i.e., macro cells, LPCs, and so on), and so forth.

A transmission processing unit 926 is configured to process information for transmission purposes, including encoding, scrambling, modulating, layer mapping, subcarrier mapping or placing, precoding, or combinations thereof. Transmission processing unit 926 is further configured to generate a transmission from encoded information over one or more subcarriers. A power control unit 928 is configured to determine a transmit power level for transmission to help reduce interference. A memory 935 is configured to store the information, the indicator, the location, transmit power level, and so forth.

The elements of communications device 900 may be implemented as specific hardware logic blocks. In an alternative, the elements of communications device 900 may be implemented as software executing in a processor, controller, application specific integrated circuit, or so on. In yet another alternative, the elements of communications device 900 may be implemented as a combination of software and/or hardware.

As an example, receiver 910 and transmitter 905 may be implemented as a specific hardware block, while information generation unit 920, indicator generation unit 922, location unit 924, transmission processing unit 926, and power control unit 928 may be software modules executing in a microprocessor (such as processor 915), a digital signal processor, or a custom circuit or a custom compiled logic array of a field programmable logic array.

Figure 10:
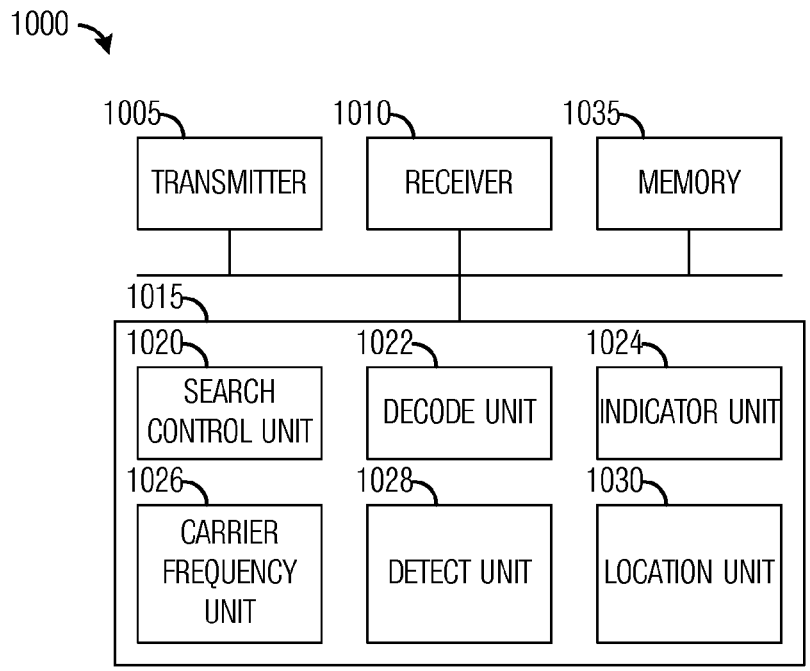
FIG. 10 illustrates an example second communications device according to example embodiments described herein.

FIG. 10 provides an alternate illustration of a communications device 1000. Communications device 1000 may be an implementation of a communications device, such as a RN or UE. Communications device 1000 may be used to implement various ones of the embodiments discussed herein. As shown in FIG. 10, a transmitter 1005 is configured to transmit information and a receiver 1010 that is configured to receive information.

A search control unit 1020 is configured to control a search for a PBCH (or some other broadcast channel and/or signal). Search control unit 1020 may determine a frequency that communications device 1000 is searching, search granularity, and so on. A decode unit 1022 is configured to decode signals found in searching. Decode unit 1022 may decode broadcast channels and/or signals, as well as information contained therein. An indicator unit 1024 is configured to decode an indicator of a carrier frequency contained in the PBCH.

A carrier frequency unit 1026 is configured to determine the carrier frequency based on the decoded indicator. A detect unit 1028 is configured to detect signals within a frequency range, for example, using blind detection. A location unit 1030 is configured to determine a location of a broadcast channel and/or signal based on information provided by decode unit 1022. A memory 1035 is configured to store received information, the indicator, the carrier frequency, and so forth.

The elements of communications device 1000 may be implemented as specific hardware logic blocks. In an alternative, the elements of communications device 1000 may be implemented as software executing in a processor, controller, application specific integrated circuit, or so on. In yet another alternative, the elements of communications device 1000 may be implemented as a combination of software and/or hardware.

As an example, receiver 1010 and transmitter 1005 may be implemented as a specific hardware block, while search control unit 1020, decode unit 1022, indicator unit 1024, carrier frequency unit 1026, detect unit 1028, and location unit 1030 may be software modules executing in a microprocessor (such as processor 1015), a digital signal processor, or a custom circuit or a custom compiled logic array of a field programmable logic array.

The above described embodiments of communications device 900 and communications device 1000 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 7 and 8—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications controller operations in a multi-carrier system, the method comprising:
    generating broadcast information for a broadcast channel;
    generating synchronization information for a synchronization channel;
    selecting, by a lower power cell, a first center frequency location for a first physical broadcast channel (PBCH) of the low power cell that is different than a second center frequency location of the synchronization channel transmitted by the low power cell and a second PBCH transmitted by a high power cell, wherein the low power cell and the high power cell are located in a heterogeneous network (Het-Net);
    mapping, by the lower power cell, the broadcast information onto subcarriers in a first group of contiguous subcarriers centered at the first center frequency location;
    mapping, by the lower power cell, the synchronization information onto subcarriers in a second group of contiguous subcarriers centered at the second center frequency location; and
    transmitting, by the lower power cell, the first PBCH over the first group of contiguous subcarriers centered at the first center frequency location; and
    transmitting, by the lower power cell, the synchronization channel over the second group of contiguous subcarriers centered at the second center frequency location.

2. The method of claim 1, wherein the first center frequency location comprises an unoccupied subcarrier in the first group of contiguous subcarriers, and wherein the unoccupied subcarrier excludes the broadcast information.

3. The method of claim 1, wherein generating the broadcast information comprises:
    encoding information to obtain encoded information; and
    modulating the encoded information to obtain the broadcast information.

4. The method of claim 1, wherein transmitting the first PBCH over the first group of contiguous subcarriers comprises transmitting the first PBCH on a subset of time intervals in a downlink subframe.

5. The method of claim 1, wherein the first center frequency location comprises an unoccupied subcarrier in the first group of contiguous subcarriers, and
    wherein mapping the broadcast information onto subcarriers in the first group of contiguous subcarriers comprises mapping the broadcast information onto a subset of carriers in the first group of contiguous subcarriers without mapping the broadcast information onto the unoccupied subcarrier.

6. The method of claim 1, further comprising determining a transmit power level for the first PBCH.

7. The method of claim 6, wherein the transmit power level comprises a zero power level.

8. The method of claim 6, wherein transmitting the first PBCH over the first group of contiguous subcarriers comprises transmitting the first PBCH at the transmit power level.

9. The method of claim 6, wherein determining the transmit power level comprises determining the transmit power level in accordance with signal measurements, interference measurements, historical information, communications traffic patterns, communications traffic load, information shared with other communications devices, or combinations thereof.

10. The method of claim 1, wherein the broadcast information specifies downlink communications system bandwidth, physical hybrid automatic repeat requested indicator channel structure, communications system frame number, or combinations thereof.

11. The method of claim 1, wherein the broadcast information comprises an indication of the first center frequency location.

12. The method of claim 11, wherein the first center frequency location comprises a DC subcarrier.

13. The method of claim 1, wherein selecting the first center frequency location comprises selecting one of multiple candidate center frequency locations of an occupied band.

14. A method for communications device operations, the method comprising:
   determining, by a mobile station, a first center frequency location of a first physical broadcast channel (PBCH) communicated by a low power cell;
   determining, by the mobile station, a second center frequency location of a synchronization channel communicated by the low power cell and a second PBCH communicated by a high power cell, wherein the second center frequency location is different than the first center frequency location, and wherein the low power cell and the high power cell are located in a heterogeneous network (Het-Net);
   receiving, by the mobile station, broadcast information from the low power cell over a first group of contiguous subcarriers centered at the first center frequency location, the first group of contiguous subcarriers carrying the first PBCH;
   receiving, by the mobile station, synchronization information from the low power cell over a second group of contiguous subcarriers centered at the second center frequency location, the second group of contiguous subcarriers carrying the synchronization channel;
   decoding, by the mobile station, the broadcast information to obtain an indicator; and
   determining a carrier frequency in accordance with the indicator.

15. The method of claim 14, further comprising detecting further transmissions at the carrier frequency.

16. The method of claim 14, wherein determining the first center frequency location comprises:
   searching a frequency range in accordance with a specified frequency granularity;
   detecting a broadcast signal while searching the frequency range; and
   decoding the broadcast signal to obtain an identifier, the identifier indicating the first center frequency location.

17. The method of claim 16, wherein the broadcast signal is transmitted by a communications controller, and wherein the broadcast signal identifier comprises identification information of the communications controller.

18. The method of claim 16, wherein determining the center frequency location further comprises applying a mapping function to the identifier.

19. The method of claim 14, wherein the first center frequency location comprises an unoccupied subcarrier in the first group of contiguous subcarriers, and wherein the unoccupied subcarrier excludes the broadcast information.

20. The method of claim 13, wherein the broadcast information specifies the multiple candidate center frequency locations.

21. A low power cell in a heterogeneous network (Het-Net), the low power cell comprising:
   a processor; and
   a computer readable storage medium storing programming for execution by the processor, the programming including instructions to:
      generate broadcast information for a broadcast channel;
      generate synchronization information for a synchronization channel;
      select a first center frequency location for a first physical broadcast channel (PBCH) of the low power cell that is different than a second center frequency location of the synchronization channel transmitted by the low power cell and a second PBCH transmitted by a high power cell in the Het-Net;
      map the broadcast information onto subcarriers in a first group of contiguous subcarriers centered around the center frequency location;
      map the synchronization information onto subcarriers in a second group of contiguous subcarriers centered at the second center frequency location;
      transmit the first PBCH over the first group of contiguous subcarriers centered at the first center frequency location; and
      transmit the synchronization channel over the second group of contiguous subcarriers centered at the second center frequency location.

22. The low power cell of claim 21, wherein the first center frequency location comprises an unoccupied subcarrier in the first group of contiguous subcarriers, and wherein the unoccupied subcarrier excludes the broadcast information.

23. The low power cell of claim 21, wherein the instructions to generate the broadcast information include instructions to:
   encode information to obtain encoded information; and
   modulate the encoded information to obtain the broadcast information.

24. The low power cell of claim 21, wherein the instructions to transmit the first PBCH over the first group of contiguous subcarriers includes instructions to transmit the first PBCH on a subset of time intervals in a downlink subframe.

25. The low power cell of claim 21, wherein the first center frequency location comprises an unoccupied subcarrier in the first group of contiguous subcarriers, and
   wherein the instructions to map the broadcast information onto subcarriers in the first group of contiguous subcarriers comprises instructions to map the broadcast information onto a subset of carriers in the first group of contiguous subcarriers without mapping the broadcast information onto the unoccupied subcarrier.

26. The low power cell of claim 21, wherein the programming further includes instructions to determine a transmit power level for the first PBCH.

27. The low power cell of claim 26, wherein the transmit power level comprises a zero power level.

28. The low power cell of claim 26, wherein the instructions to transmit the first PBCH over the first group of contiguous subcarriers includes instructions to transmit the first PBCH at the transmit power level.

29. The low power cell of claim 26, wherein the instructions to determine the transmit power level include instructions to determine the transmit power level in accordance with signal measurements, interference measurements, historical information, communications traffic patterns, communications traffic load, information shared with other communications devices, or combinations thereof.

30. The low power cell of claim 21, wherein the broadcast information specifies downlink communications system bandwidth, physical hybrid automatic repeat requested indicator channel structure, communications system frame number, or combinations thereof.

31. The low power cell of claim 21, wherein the broadcast information comprises an indication of the first center frequency location.

32. The low power cell of claim 21, wherein the first center frequency location comprises a DC subcarrier.

33. The low power cell of claim 21, wherein the instructions to select the first center frequency location include instructions to select the first center frequency location from multiple candidate center frequency locations of an occupied band.

34. A mobile station comprising:
a processor; and
a computer readable storage medium storing programming for execution by the processor, the programming including instructions to:
   determine a center frequency location of a first physical broadcast channel (PBCH) communicated by a low power cell;
   determine a second center frequency location of a synchronization channel communicated by the low power cell and a second PBCH communicated by a high power cell, wherein the second center frequency location is different than the first center frequency location, and wherein the low power cell and the high power cell are located in a heterogeneous network (Het-Net);
   receive broadcast information of the first PBCH over a first group of contiguous subcarriers centered around the first center frequency location, the first group of contiguous subcarriers carrying the first PBCH;
   receive synchronization information from the low power cell over a second group of contiguous subcarriers centered at the second center frequency location, the second group of contiguous subcarriers carrying the synchronization channel;
   decode the broadcast information to obtain an indicator; and
   determine a carrier frequency in accordance with the indicator.

35. The mobile station of claim 34, wherein the programming further includes instructions to detect further transmissions at the carrier frequency.

36. The mobile station of claim 34, wherein the instructions to determine the center frequency location include instructions to:
   search a frequency range in accordance with a specified frequency granularity;
   detect a broadcast signal while searching the frequency range; and
   decode the broadcast signal to determine the center frequency location.

37. The mobile station of claim 34, wherein the first center frequency location comprises an unoccupied subcarrier in the first group of contiguous subcarriers, and wherein the unoccupied subcarrier excludes the broadcast information.

38. The method of claim 1, wherein the synchronization channel includes a primary synchronization channel.

39. The method of claim 1, wherein the synchronization channel includes a secondary synchronization channel.

* * * * *

UNITED STATES PATENT AND TRADEMARK OFFICE
CERTIFICATE OF CORRECTION

| | |
|---|---|
| PATENT NO. | : 8,743,785 B2 |
| APPLICATION NO. | : 13/210119 |
| DATED | : June 3, 2014 |
| INVENTOR(S) | : Bingyu Qu et al. |

Page 1 of 1

It is certified that error appears in the above-identified patent and that said Letters Patent is hereby corrected as shown below:

In the Claims

In Col. 20, line 21, claim 1, delete "and".

Signed and Sealed this
Twelfth Day of August, 2014

Michelle K. Lee
*Deputy Director of the United States Patent and Trademark Office*